Sept. 1, 1925.
P. EIDE
1,552,282
MOUNTING FOR CARBONS AND THE LIKE
Filed June 20, 1921
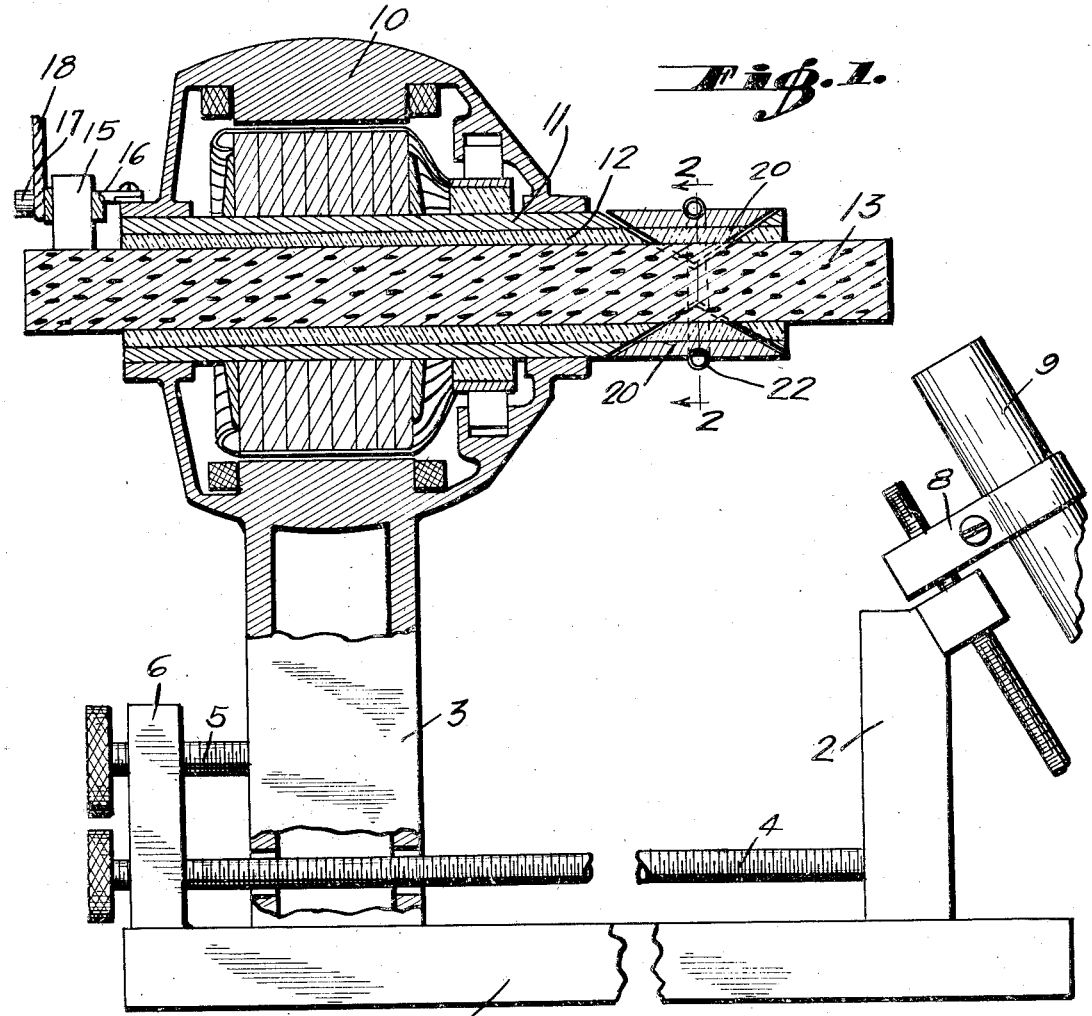
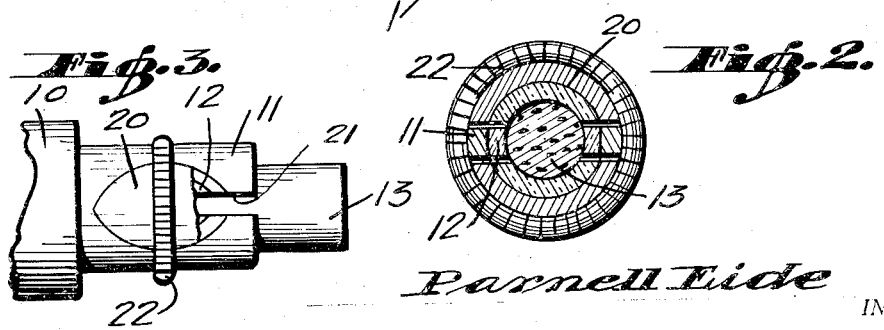
Parnell Eide
INVENTOR.
BY
Hazard & Miller
ATTORNEYS.

Patented Sept. 1, 1925.

1,552,282

UNITED STATES PATENT OFFICE.

PARNELL EIDE, OF CULVER CITY, CALIFORNIA.

MOUNTING FOR CARBONS AND THE LIKE.

Application filed June 20, 1921. Serial No. 479,036.

*To all whom it may concern:*

Be it known that I, PARNELL EIDE, a citizen of the United States, residing at Culver City, in the county of Los Angeles and State of California, have invented new and useful Improvements in Mountings for Carbons and the like, of which the following is a specification.

This invention relates to the mountings for carbons of arc lamps and the like, and has for its object the provision of a construction wherein the carbons are moved toward one another in any usual manner, and one of the carbons is rotated relative to the other carbon and during the burning of the lamp, in order that an even consumption of the carbon may be obtained and the lamp caused to burn with a uniform intensity.

The mechanism for accomplishing the purpose as thus set forth includes supports for the fixed carbon and for the rotating carbon which are either automatically or manually movable toward one another in any usual manner, and an electric motor carried by the supports for the rotating carbon having a hollow shaft in which said rotating carbon is received.

The invention will be readily understood from the following description of the accompanying drawings, in which:

Figure 1 is a vertical section through an apparatus constructed in accordance with the invention.

Fig. 2 is a transverse section on the line 2—2 of Fig. 1.

Fig. 3 is a plan view of the end of the hollow shaft of the motor and the rotatable carbon mounted therein.

In the present embodiment of the invention I have shown a base 1 carrying supports 2 and 3 which are manually movable toward and away from one another as by screw rods 4 and 5 connected to their respective supports and threaded through a bracket 6 upon base 1.

The support 2 is provided with a usual carbon clamp 8 in which is mounted the fixed carbon 9, and the support 3 carries a rotating carbon adapted to be fed toward carbon 9 by the movement of support 3 along the base 1.

As an instance of this arrangement an electric motor 10 is mounted upon support 3 and is provided with a hollow shaft 11 having its axis extending in a direction of feed of the carbon carried by support 3. A suitable bushing 12 of insulating material is fixed within hollow shaft 11, and a carbon 13 extends through said bushing so as to project beyond the end of the hollow shaft into operative position spaced from the end of carbon 9. The necessary electrical connection with carbon 13 is made in any usual manner, as by a brush 15 supported in a bracket 16 and having a terminal post 17 from which extends an electrical conductor 18.

The carbon 13 is clamped within the bushing of the hollow shaft so as to be rotated with said shaft and thereby present all parts of the end of the carbon to the end of the carbon 9 in order that even consumption of said rotating carbon may be obtained.

As an instance of this arrangement segments 20 are notched out of the end of hollow shaft 11 and bushing 12, and the end of the shaft and bushing are preferably split as shown at 21 from said notches to the outer end of the shaft. The segments 20 are contracted within the notches of the hollow shaft by means of a coil spring 22 received around the same, and the contraction of the wedge-shaped segments against carbon 13 will clamp the latter for rotation with the shaft of the motor.

Various changes may be made without departing from the spirit of the invention as claimed.

What is claimed is:

1. A base, supports slidingly mounted upon the base, a bracket fixed upon the base, screws mounted in the bracket and connected to the supports so that by manipulating the screws either or both supports may be moved to or from each other, a motor mounted upon one support and having a hollow shaft, an insulating lining in the hollow shaft, a carbon mounted in the lining, and a carbon adjustably mounted upon the other support in operative relation to the first carbon.

2. A hollow shaft, an insulating lining mounted in the hollow shaft, a carbon mounted in the insulating lining, the shaft and lining being split at corresponding ends and provided with openings communicating with the split portions, gripping members within the openings and arranged to engage the carbon, and resilient means surrounding and engaging all the parts to grip the carbon.

In testimony whereof I have signed my name to this specification.

PARNELL EIDE.